United States Patent [19]

Markofsky et al.

[11] 4,001,134
[45] Jan. 4, 1977

[54] SCALE INHIBITING PROCESS

[75] Inventors: Sheldon Boris Markofsky, Olney; Jacob Block, Rockville, both of Md.

[73] Assignee: W. R. Grace & Co., New York, N.Y.

[22] Filed: Aug. 20, 1975

[21] Appl. No.: 606,274

[52] U.S. Cl. .................................. 252/180; 210/58; 252/175; 252/181; 526/271
[51] Int. Cl.² .......................................... C02B 5/06
[58] Field of Search ................. 252/181, 175, 180; 210/58; 260/78.5 R

[56] References Cited

UNITED STATES PATENTS 3,887,528  6/1975  Lottes et al. ................. 260/78.5 R

*Primary Examiner*—Mayer Weinblatt
*Attorney, Agent, or Firm*—Charles L. Harness

[57] ABSTRACT

A process for inhibiting scale formation in sea water distillation plants by adding threshold quantities of copolymers of maleic anhydride with allylacetate.

3 Claims, No Drawings

SCALE INHIBITING PROCESS

BACKGROUND OF THE INVENTION

Maleic anhydride copolymers have been previously investigated as scale inhibiting agents in the feed waters to various types of heat exchangers. U.S. Pat. No. 3,650,970 discloses the use of alkali metal or ammonium salts of a polymer formed by esterifying styrene maleic anhydride copolymers with capped polyethylene glycols as calcium sulfate scale inhibitors. U.S. Pat. No. 3,715,307 to Johnson et al. discloses the use of maleic anhydride-vinyl acetate copolymers to reduce maintenance problems associated with the use of water in heat transfer equipment. U.S. Pat. Nos. 3,723,956, 3,617,557, 3,289,734 and 3,775,264 disclose the use of other copolymers as scale inhibitors in various types of heat exchangers.

BRIEF DESCRIPTION OF THE INVENTION

We have found that copolymers of maleic anhydride and allylacetate have good scale inhibiting properties especially for calcium carbonate and magnesium hydroxide scales. The maleic anhydride copolymers can be copolymers of either maleic anhydride or maleic acid. The range of copolymerization can be from 10% maleic to 90% maleic. The molecular weight range is 300 to 100,000 with 500 to 10,000 being preferred.

DETAILED DESCRIPTION OF THE INVENTION

The maleic anhydride copolymers can be copolymers of either maleic anhydride or maleic acid with allylacetate. The copolymers used in our novel invention may contain from 10 mole % of the maleic entity to 90 mole % of the maleic entity. The balance being the allylacetate. The ammonium, amine, alkali metal and alkaline earth salts of these copolymers also give satisfactory results.

The molecular weight of the copolymer can be from 300 to 100,000. However, the preferred molecular weight is 500 to 10,000. The maleic anhydride copolymer is added in a concentration of 0.1 to 100 parts per million with 1 to 25 parts per million being preferred.

The scale inhibitor is added to the distillation plant after first preparing a solution or dispersion of the copolymer generally containing 5 to 10% by weight of the polymer in water. Either sea water or distilled water may be used. This solution or dispersion is then fed into the plant by pumping it into the brine recycle. Alternatively the solution or dispersion may be added to the sea water feed. The polymer may also be fed into the plant using the plant vacuum.

Although our invention has been described with reference to sea water distillation plants it also gives satisfactory results in cooling systems, black liquor evaporators, waste concentrators and similar equipment.

Our invention is illustrated by the following specific but nonlimiting examples.

EXAMPLE 1

This example illustrates the test procedure used to determine the calcium carbonate ($CaCO_3$) and magnesium ($Mg(OH_2)$) inhibiting properties of the copolymer of our invention.

One liter tall form beakers are used in the test. A total of 700 ml. of sea water and the additive to be tested if any are added to these beakers. A Monel coupon is added to each beaker to provide a metal surface to induce precipitation. The beakers are placed inside a specially designed pressure vessel containing 4.5 liters of lithium chloride solution prepared to contain 1,000 g. of lithium chloride in 5.5 liters of solution. The lithium chloride solution provides a constant temperature bath about 8 to 10 degrees hotter than the sea water in the beakers. The beakers are heated in the pressure vessel at a pressure of 10 p.s.i. for predetermined periods of time, usually 35 minutes. The vessels are then cooled to reduce the pressure to atmospheric and the beakers are removed. The volume of remaining sea water is determined and the sea water is filtered on a 0.45 micron cellulose ester filter to remove any precipitated solids. The solids are dissolved in dilute sulfuric acid and brought to volume in a volumetric flask. The calcium and magnesium content of each flask is determined by titration with ethylenediamine tetraacetic acid (EDTA) and the chloride content is determined by titration with silver nitrate. Calcium and magnesium values are corrected for any calcium or magnesium that would be associated with the chloride and the sea water. The results are expressed in milligrams of calcium carbonate precipitated even though the magnesium is actually precipitated as magnesium hydroxide.

EXAMPLE 2

This example illustrates a typical method of preparing the allylacetate maleic anhydride copolymer.

A total of 29.4 g. (0.3 moles) of maleic anhydride, 30 g. (0.3 moles) of allylacetate and 88 g. of xylene were charged to a reactor equipped with a thermometer a reflux condenser, an overhead stirrer and an addition funnel. The mixture was heated to reflux and a solution containing 4.5 g. of ditertiary butylperoxide in 61 g. of xylene was added over a 2 hour period while the reaction mixture was heated to reflux temperature and stirred. After addition was complete the reflux was continued for an additional 2 hours. The heating mantle was removed and 150 g. of water was slowly added to the reaction media. After cooling to room temperature 12 g. of sodium hydroxide were added and the mixture stirred until all solids dissolved and a white emulsion formed. Stirring was discontinued and the xylene layer was separated by decantation. The aqueous phase weighed 234.9 g. and contained 26.7% solids.

A 70 g. portion of the aqueous phase was evaporated to dryness under vacuum at 70°–75° C. The resulting solids were dissolved in 50 ml. of water and the solution evaporated to dryness again. The solids recovered were used in the tests.

EXAMPLE 3

The effectiveness of the copolymer prepared as described in Example 2 was determined and compared with a maleic-ethylene oxide copolymer having a molecular weight of 1500 to 2000 and a maleic-methyl vinyl ether copolymer commercially available under the trade name of Gantrex AN-119 from General Aniline and Film Corp. The data collected is presented in Table I below.

TABLE 1

| Effect of Maleic Copolymers on $Mg(OH)_2$ and $CaCO_3$ Scales | | | |
|---|---|---|---|
| Additive | Dosage (ppm) | Precipitated $CaCO_3$ (mg) | Precipitated $Mg(OH)_2$ (as mg $CaCO_3$) |
| None | 0 | 8.6 | 58.6 |
| maleic-allylacetate copol. (Run 1) | 6 | 0.0 | 19.6 |
| maleic-allylacetate copol. (Run 2) | 6 | 0.0 | 7.7 |
| maleic-ethylene copol.* | 6 | 1.3 | 64.0 |
| maleic-methyl vinyl ether** | 6 | 1.3 | 47.8 |

*1:1, MW = 1500–2000
**1:1, low molecular weight, sold by GAF under trade name of GANTREZ AN-119

It is apparent from these data that the maleic-allylacetate copolymer gives substantially better results both as a calcium carbonate and magnesium hydroxide scale inhibitor than either the maleic ethylene copolymer or the maleic methyl vinyl ether copolymer.

What is claimed is:

1. A process for inhibiting the deposition of scale onto the heat exchange surfaces of evaporators which consists essentially of adding a copolymer of maleic anhydride or maleic acid and allylacetate, the copolymer containing from 10 to 90% maleic anhydride or maleic acid and having a molecular weight of 500 to 10,000; so as to provide a concentration of 0.1 to 100 parts per million.

2. The process according to claim 1 wherein the evaporators are saline water evaporators.

3. The process according to claim 1 wherein the copolymer is present as 1 to 25 parts per million.

* * * * *